(12) United States Patent
Ehlers et al.

(10) Patent No.: US 7,141,636 B1
(45) Date of Patent: Nov. 28, 2006

(54) METHOD FOR PRODUCING A POLYMER

(75) Inventors: Jens Ehlers, Hamminkeln (DE); Stanislaw Haftka, Wesel (DE); Louis Wang, Missouri City, TX (US)

(73) Assignee: Ticona GmbH, (DE)

( * ) Notice: Subject to any disclaimer, the term of this patent is extended or adjusted under 35 U.S.C. 154(b) by 0 days.

(21) Appl. No.: 09/787,875

(22) PCT Filed: Sep. 23, 1999

(86) PCT No.: PCT/EP99/07085

§ 371 (c)(1),
(2), (4) Date: Jul. 19, 2001

(87) PCT Pub. No.: WO00/18809

PCT Pub. Date: Apr. 6, 2000

(30) Foreign Application Priority Data

Sep. 25, 1998 (DE) ............... 198 43 858

(51) Int. Cl.
*C08F 4/642* (2006.01)
*C08F 4/655* (2006.01)

(52) U.S. Cl. ............. 526/159; 526/909; 502/103; 502/104; 502/107

(58) Field of Classification Search ........ 526/159, 526/909; 502/103, 104, 107
See application file for complete search history.

(56) References Cited

U.S. PATENT DOCUMENTS 4,306,047 A * 12/1981 Kortbeek et al. .......... 526/142
4,329,256 A * 5/1982 Rust et al. ............... 252/429 B
4,894,424 A * 1/1990 Lassalle ................ 526/125
4,910,272 A * 3/1990 Marchand et al. ......... 526/129
5,292,837 A * 3/1994 Heinrich et al. ........... 526/114
5,633,419 A * 5/1997 Spencer et al. ........... 585/522

FOREIGN PATENT DOCUMENTS

| EP | 0485006 | 5/1992 |
|---|---|---|
| FR | 2202107 | 5/1974 |
| GB | 2028844 | 3/1980 |

* cited by examiner

*Primary Examiner*—Roberto Rabago
(74) *Attorney, Agent, or Firm*—Connolly Bove Lodge & Hutz

(57) ABSTRACT

The present invention relates to a process for preparing a catalyst, a novel polymer and a process for preparing the polymer. In particular, the invention provides a process for preparing a homopolymer and/or copolymer having an irregular particle structure and
a melt flow index (MFR 190/15) of from 1.3 g/10 min to 10 g/10 min,
a molecular weight distribution $M_w/M_n$ of from 3 to 30,
a bulk density of from 0.05 g/cc to 0.4 g/cc and
a particle size of from 5 μm to 300 μm,
which comprises polymerizing the monomers in the presence of a mixed catalyst comprising a titanium component and an organic aluminum compound and the presence of a molar mass regulator.

10 Claims, No Drawings

METHOD FOR PRODUCING A POLYMER

The present invention relates to a process for preparing a catalyst, a novel polymer and a process for preparing the polymer.

In processing of polyethylene, the polyethylene is usually melted and shaped to form a compact molding. From an economic point of view, the use of a polymer which is as compact as possible is always desirable. This objective becomes particularly clear in the preparation and use of ultrahigh molecular weight polyethylene. This is described in the prior art in JP-A-07041514, JP-A-06179720, EP-A-574153, JP-A-05070519.

Fillers are predominantly distributed homogeneously in the melt of the polymer. If this is impossible from a processing point of view, the use of polymer having an irregular structure is a possibility. The bulk density of the polymer can be employed as an easy-to-use physical measure of the particle and powder morphology. Thus, JP-A-519120423 describes the use of graphite-filled UHMWPE. The use of UHMWPE having a bulk density of less than 0.25 g/ccm is advantageous here.

In addition, the processing of UHMWPE under reduced pressure to form porous semifinished and finished parts is known. For use as filter elements, a low pressure drop is necessary. Here too, an irregular structure of the sintered UHMWPE material is very helpful; cf. JP-A-09003236, JP-A-09001633.

In the production of filter elements, both requirements apply at the same time. EP-A-0 554 223 discloses a process for producing a filter unit. The morphology and low bulk density of the binder and the activated carbon are matched to one another. The high viscosity of the binder results in a lower strength of the resulting filter unit.

U.S. Pat. No. 4,753,728 discloses an activated carbon filter block comprising activated carbon particles which are bound by a polymer to form a filter block. The polymer has a melt flow index of less than about 1 gram per 10 minutes, determined in accordance with ASTM D 1238 at 190° C. and a loading of 15 kilograms. The polymer becomes sticky at elevated temperature. The polymer does not become sufficiently liquid to wet the activated carbon particles to a significant extent. A commercially available polymer GUR® 212 which has a melt flow index of <0.1 gram per 10 minutes, determined in accordance with ASTM D 1238 at 190° C. and a loading of 15 kilograms, and is an ultrahigh molecular weight polyethylene is disclosed.

EP-A-0 792 673 discloses a binder for producing filters by the extrusion technique. The binder has very high flow and an inhomogeneous distribution. The inhomogeneous distribution in the mixture leads to a fragile product. In addition, it comes to the surface of the activation carbon through the binder. The result is a decrease in the filter capacity.

Apart from the molar mass and the morphology, the particle size of the polymer also has to be matched to the filler to make homogeneous mixing possible and to reduce demixing during processing of the pulverulent mixtures.

The previously known processes for preparing polyethylene make it possible to influence the external shape of the polymer particles only within very narrow limits. The mean catalyst particle size is usually determined during the preparation of the catalyst. It is known that the catalyst particle size can be influenced in a targeted way by shearing during and after production of the solid catalyst particle by chemical reaction of the individual components. The particle size usually decreases at higher shear. At a circumferential velocity of the stirrer fixed by engineering circumstances, the shear can be controlled by varying the solvent viscosity. If, in addition, the solvent is predetermined, its viscosity can be influenced by means of the temperature. As the temperature decreases, the shear generally increases owing to the higher viscosity of the solvent. This results in catalysts having a low particle size. Thus, the catalyst described in EP-A-0645403 is prepared at a low temperature in order to obtain a finely particulate catalyst. The use of higher viscosity solvents in the preparation of the catalyst also leads to an analogous result.

It is an object of the present invention to provide an economical and environmentally friendly process for preparing a homopolymer and/or copolymer having an irregular particle structure.

This object is achieved by a process for preparing a homopolymer and/or copolymer having an irregular particle structure, which comprises polymerizing the monomers in the presence of a mixed catalyst comprising a titanium component and an organic aluminum compound and the presence of a molar mass regulator.

The process of the invention preferably gives a polyethylene having a viscometrically measured molar mass of $1.5-4.1\times10^5$ g/mol (M by the Margolies method=$5.37\times10^4$ $[IV]^{1.49}$), a bulk density of less than 0.4 g/ccm, in particular from 0.05 g/ccm to 0.4 g/ccm, and a mean particle size of 5–300 µm and a molar mass distribution $M_w/M_n$ of 3–30 or preferably a polyethylene homopolymer and/or copolymer having a melt flow index (MFR 190/15) of from 1.3 g/10 min to 10 g/10 min, a molecular weight distribution $M_w/M_n$ of from 3 to 30, a bulk density of from 0.05 g/cc to 0.4 g/cc and a particle size of from 5 µm to 300 µm. A polyethylene homopolymer and/or copolymer having a melt flow index (MFR 190/15) of from 1.3 g/10 min to 10 g/10 min, a molecular weight distribution $M_w/M_n$ of from 3 to 10, a bulk density of from 0.1 g/cc to 0.4 g/cc and a particle size of from 20 µm to 200 µm or a polyethylene homopolymer and/or copolymer having a melt flow index (MFR 190/15) of from 1.4 g/10 min to 5 g/10 min, a molecular weight distribution $M_w/M_n$ of from 4 to 8, a bulk density of from 0.13 g/cc to 0.3 g/cc and a particle size of from 60 µm to 180 µm is particularly preferably obtained. A polyethylene homopolymer and/or copolymer having a melt flow index (MFR 190/15) of from 1.4 g/10 min to 3 g/10 min, a molecular weight distribution $M_w/M_n$ of from 4 to 8, a bulk density of from 0.15 g/cc to 0.28 g/cc and a particle size of from 60 µm to 160 µm is very particularly preferably obtained.

The process of the invention makes it possible to prepare preferably pulverulent polyethylene having particle sizes which can be varied. The molar mass of the polymer should be set so that a material having a measurable flow is obtained. At the same time, a narrow molar mass distribution ensures that the pores of the activated carbon are not blocked during sintering in filter production. Furthermore, sufficient powder flow should ensure good drying and conveying behavior.

In addition, variation of the polymer morphology is made possible. This can be achieved by means of the polymerization temperature selected or else by means of the ethylene partial pressure. Both a higher temperature and a higher ethylene partial pressure in the polymerization result in an increase in the bulk density.

The titanium component used according to the invention is obtained in a single-vessel reaction. The diluted Ti(IV) compound is reacted with the diluted aluminum compound at from −40° C. to 100° C. in a molar ratio of from 1:0.01 to 1:4 for from 0.5 minute to 60 minutes.

According to the invention, the particle size of the catalyst is determined by the activation temperature of the catalyst. This can influence the particle size of the polymer, which correlates with the particle size of the catalyst solid because of the replication behavior due to the multigrain behavior.

The reaction of the Ti(IV) compound with the organic aluminum compound is carried out in a pure saturated hydrocarbon or a mixture of saturated hydrocarbons at temperatures of from −40° C. to 100° C., preferably from −20° C. to 50° C., particularly preferably from 0° C. to 30° C. The concentrations of the reactants in the starting solutions are from 0.1 mol to 9.1 mol of Ti(IV) compound/l of solvent and from 0.01 mol to 1 mol of Al compound/l, in particular from 0.2 mol to 5 mol of Ti(IV) compound and from 0.02 mol to 0.2 mol of Al compound.

To react the components, the Ti(IV) component is added to the Al component. The addition time is from 0.1 minute to 60 minutes, preferably from 1 minute to 30 minutes. Depending on the temperature, the reaction is complete after from 1 minute to 600 minutes. Cerimetrically, the Ti(III) yield is at least 95%.

The polymerization is carried out in suspension in one or more stages, continuously or batchwise. The polymerization temperature is from 30° C. to 130° C., preferably from 50° C. to 90° C. The ethylene partial pressure is set in accordance with the bulk density of the polymer. It is less than 4 MPa, in fact from 0.02 MPa to 4 MPa, preferably from 0.02 MPa to 2 MPa, particularly preferably from 0.04 MPa to 1 MPa. As is customary in Ziegler-Natta polymerizations, an organoaluminum compound is used as cocatalyst. The aluminum component is added to the suspension medium in a ratio to the Ti component of Al:Ti=1:1–30:1. The preferred Al:Ti ratio is in the range from 2:1 to 20:1.

The reaction medium for the polymerization is, as is customary in Ziegler-Natta polymerizations, an inert solvent such as butane, pentane, hexane, cyclohexane, nonane, decane or their higher homologues and isomers as pure substances or mixtures. The solvent is freed of catalyst poisons such as oxygen, moisture or sulfur compounds before use.

The molar masses of the polymers can be adjusted in a known manner by introduction of appropriate components. Preference is given to using hydrogen. The ratio of ethylene partial pressure to hydrogen partial pressure is from 0.5:1 to 10:1, preferably from 2:1 to 8:1.

Addition of 1-olefins makes it possible, as is known, to obtain corresponding copolymers in addition to ethylene homopolymers.

The polymer is separated from the suspension medium under inert gas and dried in a fluidized bed. When using high-boiling hydrocarbons, the reaction product is subjected beforehand to treatment with steam.

The suspension medium is returned directly to the polymerization reactor.

Stabilizing additives such as the customary salts of long-chain fatty acids, e.g. calcium, zinc or magnesium stearate, can be added to the polymer.

To describe the polymers, the following values are reported:

mean particle diameter ($d_{50}$): determined by laser light scattering using the particle size analyzer Helos-Rhodos measurement and data processing system from Sympatec GmbH, optical concentration=4–7%, bulk density (BD): determined in accordance with DIN 53 466, melt flow index (MFR): the melt flow index 190/15 was determined in accordance with ISO 1133; 0.2% of ionol were added as stabilizer, viscosity number (VN): determined in accordance with ISO 1628-3 in decalin at a concentration of 0.1 g/dl; to calculate the molar mass, the limiting viscosity (IV) is calculated therefrom using the Martin equation, B value: this value gives, as dimensionless parameter, information about the particle size of the catalyst. On the basis of the replication effect, the following relationship applies: $\log(\text{catalyst yield})=3\times\log(d_{50})-B$. The smaller the B value, the finer the mean particle diameter of the catalyst.

The invention is illustrated by the examples:

EXAMPLES

Preparation of Catalyst 13 mol of isoprenylaluminum (IPRA) and 252 l of Exxsol were placed under a protective gas blanket in a 600 l vessel. At an initial temperature of 8° C.–13° C., a solution of titanium tetrachloride in Exxsol® D30 (concentration: 3000 mmol/l) was added while stirring, so that a ratio of Ti:IPRA of 1:0.78 was established in the reaction mixture. The addition time was 120 sec–140 sec. The reaction proceeded exothermically and spontaneously. The temperature rose quickly by 5° C. over a period of 4 minutes. The mixture was stirred while cooling for 2 hours to allow further reaction to occur. After 15 hours, the upper phase was decanted off. The solid was admixed with 200 l of Exxsol® D30 and 0.7 mol of IPRA, and then used for polymerization.

Polymerization

The polymerization was carried out in one stage in a continuously operated plant with recirculation of the suspension medium. The suspension medium used was a mixture of saturated hydrocarbons having a boiling point range of 140° C.–170° C. (Exxsol® D30) which had previously been purified over molecular sieves and aluminum oxide. The polymerization was carried out in a 40 l reactor at a reaction temperature of 70° C.–82° C. and an ethylene partial pressure of from 0.16 MPa to 0.27 MPa.

On the basis of experience, the bulk density of the polymer increases by about 0.02–0.05 g/l on scale-up.

Examples 5 and 6 were carried out like Examples 1 to 4. In Examples 5 and the amount of catalyst used was reduced from 0.95 mmol of Ti/kg of PE to half this quantity. To be able to achieve the required product properties, both the reaction temperature and the ethylene partial pressure were increased compared to Examples 1 to 4.

The parameters and measurement results are shown in the table below.

TABLE

| Activation temp. of the catalyst [° C.] | Polymerization temp. [° C.] | p(C$_2$H$_4$/ [bar] | C$_2$H$_4$/H$_2$ | MFR 190/15 [g/10 min] | BD [g/l] | d(50) [μm] | B value | Ex. |
|---|---|---|---|---|---|---|---|---|
| 9  | 70 | 2.20 | 2.04 | 1.6 | 163 | 97  | 3.52 | 1 |
| 10 | 70 | 1.65 | 1.92 | 1.9 | 161 | 145 | 3.47 | 2 |
| 11 | 70 | 1.65 | 2.04 | 1.6 | 171 | 97  | 2.94 | 3 |
| 12 | 70 | 1.68 | 2.23 | 1.8 | 187 | 84  | 2.80 | 4 |
| 10 | 82 | 2.7  | n.d. | 1.4 | 190 | 172 | 3.41 | 5 |
| 13 | 80 | 2.4  | n.d. | 1.4 | 230 | 85  | 2.42 | 6 |

The invention claimed is:

1. A process for preparing a homopolymer or copolymer having a melt flow index (MFR 190/15) of from 1.3 g/10 min to 10 g/10 min, a molecular weight distribution $M_w/M_n$ of from 3 to 30, a bulk density of from 0.05 g/cc to 0.28 g/cc and an average particle size of from 5 μm to 300 μm which consists of polymerizing a monomer using a mixed catalyst prepared by reacting a Ti(IV) compound with an organic aluminum compound at from −20° C. to 50° C. in a suspension medium for from 0.5 minute to 60 minutes.

2. The process for preparing a homopolymer or copolymer as claimed in claim 1, wherein the molecular weight distribution $M_w/M_n$ of from 3 to 10, the bulk density is from 0.1 g/cc to 0.28 g/cc and the average particle size is from 20 μm to 200 μm.

3. The process for preparing a homopolymer or copolymer as claimed in claim 1, wherein the melt flow index (MFR 190/15) is from 1.4 g/10 min to 5 g/10 min, the molecular weight distribution $M_w/M_n$ of from 4 to 8, the bulk density is from 0.13 g/cc to 0.28 g/cc and the average particle size is from 60 μm to 180 μm.

4. The process for preparing a homopolymer or copolymer as claimed in claim 1, wherein the melt flow index (MFR 190/15) is from 1.4 g/10 min to 3 g/10 min, the molecular weight distribution $M_w/M_n$ of from 4 to 8, the bulk density is from 0.15 g/cc to 0.28 g/cc and the average particle size is from 60 μm to 160 μm.

5. The process for preparing a homopolymer or copolymer as claimed in claim 1, wherein the polymerization is carried out at a temperature of from 30° C. to 130° C. and a pressure of from 0.05 MPa to 4 MPa.

6. The process for preparing a homopolymer or copolymer as claimed in claim 1, wherein the polymerization is carried out at a temperature of from 50° C. to 90° C.

7. The process for preparing an ethylene homopolymer or copolymer as claimed in claim 1, wherein the concentrations of the reactants in the starting solutions in the preparation of the mixed catalyst are from 0.1 mol to 9.1 mol of Ti(IV) compound/l of solvent and from 0.01 mol to 1 mol of Al compound/l.

8. The process as claimed in claim 1, wherein reacting said Ti(IV) compound with said organic aluminum compound is at a from the temperature is from 0 to 30° C. from 1 to 30 minutes.

9. The process for preparing a homopolymer or copolymer as claimed in claim 1, wherein the polymerization is carried out at a temperature of from 50° C. to 90° C. and a pressure of from 0.02 MPa to 2 MPa.

10. The process for preparing a homopolymer or copolymer as claimed in claim 9, wherein the pressure is from 0.04 MPa to 1 MPa.

* * * * *